ns
Patented Mar. 12, 1940

2,193,216

UNITED STATES PATENT OFFICE 2,193,216

GLYCERYL SULPHONATED OIL COMPOUND FOR TREE SPRAYS

Elmer W. Adams, Hammond, Ind., assignor to Standard Oil Company, Chicago, Ill., a corporation of Indiana No Drawing. Original application March 5, 1934, Serial No. 714,115. Divided and this application December 31, 1937, Serial No. 182,843

8 Claims. (Cl. 167—28)

This invention relates to an insecticidal oil spray and it pertains more particularly to a spray which may be safely applied to citrus foliage as well as deciduous foliage for protection against plant parasites such as red spider, scale, codling moth, pear psylla, etc. This application is a division of application Serial No. 714,115, filed March 5, 1934, (which has issued as U. S. Patent 2,115,380).

The object of the invention is to provide a composition of oil with an oil-soluble emulsifier-insecticide which results in the production of a quick breaking emulsion when the composition is mixed with water, so that when such an emulsion is sprayed onto plant leaves the oil is released and deposited thereon in a thin, continuous film. A more important object of the invention is to provide an oil solute which is non-injurious to plant leaves and which retards or prevents the penetration of oil into the plant leaves and other tissues. In other words, my object is to provide an oil spray which may be applied directly as an atomized mist, or which may be applied in the form of an aqueous emulsion, but which will in either case give protection against plant parasites without injuring the plant leaf, and particularly without being absorbed into the plant tissues, causing undesirable biological changes therein. The primary object of my invention is therefore to avoid plant injuries due to interference with plant respiration and to metabolic disturbances in the plant caused by the penetration of oil into the leaves such as the consequent interference with translocation of synthesized starch from the leaf to the other parts of the plant.

In practicing my invention I employ sulphonated compounds which have been modified to control their emulsifying action. The modified sulphonic compounds also have the effect of retarding the penetration of oil into plant leaves since they provide a means for carrying hydroxy groups into the oil in oil-soluble form. The sulphonated oils or sulphonic compounds may be combined with polyhydric or polyatomic alcohols in such a manner that the latter are rendered oil-soluble even though they may contain one or more free hydroxy groups. I have found that aluminum sulphonic soaps are remarkably effective, both in giving quick breaking emulsions which deposit oil in the desired manner and in retarding oil penetration. It appears that the aluminum has the same effect as the OH groups, and in fact this may be due to the property of aluminum of combining with a small amount of water and carrying it into the oil. At the same time the sulphur in the composition may have a beneficial insecticidal effect. The invention will be more clearly understood from the following descriptions of preferred embodiments.

Since the invention relates primarily to the so-called "summer oils" or oils to be applied to green plants, I employ highly refined oils commonly known as "white oils". These oils are petroleum distillates ranging in viscosity from about 40 to 100 seconds Saybolt at 100° F. and they consist chiefly of paraffinic components from which the so-called "smoky hydrocarbons", unsaturated hydrocarbons and chemically reactive components have been removed by sulphuric acid treatment and/or by extraction with suitable solvents, absorbent clay, etc. I will describe the present invention as used with a white oil having a viscosity of about 50 seconds Saybolt at 100° F. and having an unsulphonatable residue of about 95%.

In order to decrease the tendency of the oil to penetrate into and be absorbed by plant leaves, I add an oil-soluble hydroxy compound or an aluminum compound thereto. This compound may be described as an esterified sulphonic compound and it preferably contains one or more OH groups.

My preferred example is aluminum mahogany soap; Al(OSO$_2$R)$_3$. Instead of three sulphonic acid groups, I may have one or two OH groups or other radicals. Preferably I prepare the aluminum mahogany soap as hereafter described.

Other examples are glyceryl sulphonates:

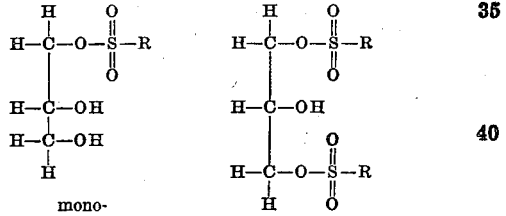

glyceryl sulpholeates,

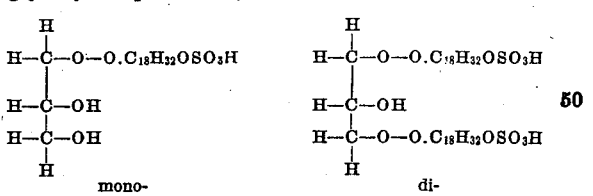

and mixed glyceryl esters, such as hydroxy-mahogany-oleate, hydroxy-hydroxystearate-oleate, hydroxy-mahogany-hydroxystearate, etc.

The sulphonic compounds are preferably those derived from the sulphonation of mineral oils and are commonly known in the art as "mineral oil sulphonates", the preferentially oil-soluble acids and salts being called "mahogany compounds" and the preferentially water-soluble acids and salts being called "green acid compounds". These mahogany and green acid compounds are all more or less oil-soluble and they have a pronounced effect on the surface tension characteristics of the oil in which they are dissolved. These compounds may be combined with a polyhydroxy alcohol such as glycerin or they may be combined with a polyvalent cation such as aluminum, magnesium, zinc, iron, lead, etc. Emulsifying action of all types and degrees may be obtained by proportioning the amounts of glyceryl sulphonate compounds with aluminum sulphonate or the like and/or by selecting a mineral oil sulphonic compound of the proper molecular weight. Different spray oils and different plant parasites require amounts and types of emulsifiers which must be determined in each individual case by simple preliminary tests and my invention is not limited to any particular proportions, but to the combination of hydroxylated sulphonic compounds or sulphonated oils for the improvement of tree sprays.

The mahogany acid compounds may be made as taught by Humphreys U. S. Patent 1,286,179 or Petroff 1,196,274 and may be purified as taught by Divine 1,493,111. The green acid compounds may be made as taught by Humphreys 1,474,933, Divine 1,301,662, etc. In general, these products are obtained when mineral oil distillates of about 60 to 300 seconds Saybolt viscosities at 100° F. are treated with concentrated or fuming sulphuric acid in the manufacture of white oils or medicinal oils. After a preliminary acid treatment to remove carbonaceous materials, the acid is applied in a plurality of "dumps", sludge is separated from the treated oil after each "dump", green acids are extracted from the sludge with alcohol or salted out, and mahogany compounds are extracted from the treated oil. These compounds probably contain complex esters and other reaction products between the oil components and the sulphuric acid, but the green acids and mahogany acids are sufficiently acid to partially esterify glycerin and/or to form salts with sodium potassium, aluminum, zinc, etc.

It is from many standpoints desirable to neutralize the sulphonic acids before they are extracted with alcohol and I may prepare my aluminum mahogany soap from the sodium mahogany soap which results from said neutralization. The sodium mahogany soap is preferably diluted with kerosene or naphtha to decrease its viscosity and minimize emulsion difficulties. The diluted soda soap is then treated with an excess of a water-soluble aluminum salt such as aluminum sulphate. The naphtha or kerosene solution of aluminum mahogany soap then separates from the aqueous layer of sodium sulphate. I preferably use an excess of aluminum sulphate and after the reaction is complete I wash thoroughly with water. The naphtha or kerosene is then distilled from the aluminum mahogany soap and it is ready for use in my invention. Ordinarily the soda mahogany soap and, consequently, the aluminum mahogany soap is not pure, but contains considerable amounts of oil, water and sodium sulphate. Thus my aluminum mahogany soap may contain up to 30% or 35% of oil, up to 10% or 20% of water, and up to 10% or 15% of sodium and/or aluminum sulphate. When a more highly purified aluminum mahogany soap is desired, the purification may be effected by extracting with concentrated ethyl alcohol or the like.

Instead of employing sulphonation products of mineral oils, I may use sulphonated vegetable or animal oils as exemplified by sulphonated castor oil, commonly known in the art as "Turkey red oil". Here again there may be some question as to the exact chemical formula of the resulting products, but they are prepared by allowing concentrated sulphuric acid to run into castor oil slowly and with constant stirring at a temperature less than 35° C. The product is then mixed with a small quantity of water, whereupon it separates into two layers and the lower layer is drawn off and neutralized. Sulphonated castor oil, like sulphonated mineral oil, may be fractionated into preferentially water-soluble and preferentially oil-soluble portions and either or both of these portions may be employed in the practice of my invention.

The esterification of my sulphonic acids (or acids obtained from products of the sulphonation of vegetable and mineral oils) and fatty acids may be effected by dissolving them in the polyhydric alcohol and bringing about the reaction by means of sulphuric acid, hydrogen chloride, $ZnCl_2$ or other condensing agent. It should be understood, however, that I do not limit myself to any particular means for preparing these products and I contemplate the use of any well known chemical method to accomplish this result.

It should be noted that my invention includes the use of mixed esters as well as simple and hydroxy esters or, in other words, I may employ a compound of glycerin containing one OH group, one mineral oil sulphonic acid group, and one oleic, stearic or ricinoleic acid, etc. group. The outstanding feature of the invention is the use of aluminum sulphonate or oil-soluble hydroxy sulphonic compounds however prepared or combined.

As an embodiment of my invention, I may dissolve about $\frac{1}{10}$% to 5%, preferably 2% of aluminum mahogany soap in a Western white oil of 50 seconds Saybolt viscosity at 100° F. This low viscosity white oil is more difficult to emulsify than heavier oils and it therefore gives an excellent demonstration of my improved emulsifier and penetration regulator. The oil solution may be applied to leaves directly by an atomizer or the like, but I prefer to apply it in an aqueous emulsion. The oil containing 2% of aluminum mahogany soap is poured into a mixer and water is gradually added thereto, preferably by withdrawing the mixture from the base of the tank and injecting it at an upper part thereof. The oil emulsifies immediately to give a quick breaking emulsion, characterized by extremely small oil particle size. If the emulsion is allowed to stand for three or four minutes, a trace of free oil separates at the surface and if it is allowed to stand for eight to ten minutes, the free oil layer may grow to an appreciable thickness, perhaps one-eighth inch thick. The remarkable characteristic of this emulsion is the fact that it does not cream in the manner of other oil emulsions. The oil particles are very much smaller than those of ordinary quick breaking emulsions and it appears that each particle is surrounded by a tenuous, weak film of emulsifier which permits a ready rupture of the film and a release of the oil. Microscopic studies of the emulsion clearly show the extremely small particle size and the phenomena of the breaking and running together of these particles. I prefer to employ the aqueous emulsion at a strength of about 1% to 2% oil and when such an emulsion is sprayed onto plant leaves it is found that the emulsion breaks immediately, giving a good oil deposit, excellent coverage, and an altogether desirable glossy oil film. This oil film is also found to be much more persistent on plant leaves than when the same oil is emulsified with calcium caseinate or other ordinary emulsifying materials.

Quick breaking emulsions are usually characterized by large particle size and emulsions having a large particle size usually tend to cream on standing. My emulsion is characterized by a very small particle size and by a tendency of the emulsion to liberate a very small amount of free oil on standing.

The aluminum mahogany soap emulsifier may be too quick breaking in its characteristics for many applications and where greater stability is desired I may add a small amount of glyceryl oleate or other oil and water emulsifying agents. When both 1% of glyceryl oleate and 2% of aluminum mahogany soap were added to the white oil hereinabove described, the emulsion was more stable,—it stood as long as five minutes with no visible oil separation. At seven minutes, the emulsion showed a trace of free oil. Also, it is found that the oil globules are larger with these combined emulsifiers than when aluminum mahogany soap is used by itself. The gylceryl oleate-aluminum mahogany soap is found to cream in about seventeen minutes and all in all it is found to be a very excellent emulsifier composition for ordinary work on citrus trees.

As another example of my invention, I may dissolve in oil from about $\frac{1}{10}$% to 5%, preferably about 2%, of a mixture of glyceryl sulphonates containing on an average about one free hydroxy group per molecule. If large amounts of this compound are employed, the oil may tend to form extremely stable emulsions, and to bring about a release of the oil on plant leaves I may employ small amounts, say from $\frac{1}{10}$% to 5% of a polyvalent metal sulphonic acid salt such as aluminum sulphonate. As hereinabove stated, I do not limit myself to any particular proportions since the necessary amounts of the aluminum sulphonate and/or polyhydroxy esters of sulphonated oil compounds may be readily determined by simple preliminary experiments with any oil which is to be used to combat any particular insect under any particular climatic conditions.

While I have described the sulphonation of mineral oils and castor oil, it should be understood that the invention is also applicable to the sulphonation of other vegetable and animal oils. Also, I may sulphonate oleic acid, ricinoleic acid, etc., and then esterify with glycol or glycerin. My invention is intended to cover the use of oil-soluble hydroxy sulphonic compounds however prepared or combined, and particularly to cover aluminum mahogany soap and equivalent sulphonic compounds of polyvalent metals.

I claim:

1. An insecticidal oil spray which comprises a petroleum distillate having a viscosity of about 40 to 110 seconds Saybolt at 100° F. which is substantially free from components removable by sulphuric acid and which contains from about $\frac{1}{10}$% to 5% of a hydroxy ester obtained by condensing a sulphonated oil with a polyhydroxy alcohol of the class consisting of glycol and glycerine.

2. The composition of claim 1 wherein the oil is a mineral oil.

3. The composition of claim 1 wherein the oil is a vegetable oil.

4. The composition of claim 1 wherein the oil is an animal oil.

5. An insecticidal oil composition comprising a refined petroleum oil distillate having a viscosity of about 40 to 100 seconds Saybolt at 100° F. and containing in solution about $\frac{1}{10}$% of 5% of an ester of a polyhydroxy alcohol of the class consisting of glycol and glycerine and a sulphonated oil.

6. The insecticidal oil composition of claim 5 wherein the sulphonated oil is a sulphonated mineral oil.

7. The insecticidal oil composition of claim 5 wherein the sulphonated oil is a sulphonated animal oil.

8. The insecticidal oil composition of claim 5 wherein the sulphonated oil is a sulphonated vegetable oil.

ELMER W. ADAMS.

CERTIFICATE OF CORRECTION.

Patent No. 2,193,216. March 12, 1940.

ELMER W. ADAMS.

It is hereby certified that error appears in the printed specification of the above numbered patent requiring correction as follows: Page 3, second column, line 38, claim 5, for "of 5% of" read to 5% of; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.